US006693726B2

United States Patent
(12) United States Patent
Childs et al.
(10) Patent No.: US 6,693,726 B2
(45) Date of Patent: Feb. 17, 2004

(54) AUTOMATIC COLOR MAP CONVERSION

(75) Inventors: David Walter Childs, Vancouver, WA (US); Philip B Cowan, Vancouver, WA (US); Jay S Gondek, Camas, WA (US); Julie Hong Ouyang, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 340 days.

(21) Appl. No.: 09/944,641

(22) Filed: Aug. 31, 2001

(65) Prior Publication Data

US 2003/0043391 A1 Mar. 6, 2003

(51) Int. Cl.[7] .................................................. G06K 15/00

(52) U.S. Cl. .......................... 358/2.1; 358/1.9; 358/501

(58) Field of Search .......................... 358/1.3, 1.9, 2.1, 358/3.09, 501, 517, 518; 345/620

(56) References Cited

U.S. PATENT DOCUMENTS

| | | | |
|---|---|---|---|
| 6,198,843 B1 | 3/2001 | Nakauchi et al. | |
| 6,220,687 B1 * | 4/2001 | Takahashi | 347/5 |
| 2002/0029702 A1 * | 3/2002 | Nagao | 101/115 |

* cited by examiner

*Primary Examiner*—Jerome Grant, II

(57) ABSTRACT

A method of converting a source color map from a source print mode to a destination print mode comprises the steps of performing a constant hue clipping process to preserve ink ratios of destination colors to source colors and performing a channel independent clipping process to preserve ink volume.

35 Claims, 3 Drawing Sheets

100

Perform constant hue clipping

110

Perform channel independent clipping

AUTOMATIC COLOR MAP CONVERSION

BACKGROUND OF THE INVENTION

1. Field of the Invention

The present invention relates to color printing, and more particularly, to color map conversion between different print modes for color printing.

2. Background

A color map is a table that defines the relationship between different sets of colors, for example, between red, green and blue, commonly abbreviated as RGB, and black, cyan, magenta and yellow, commonly abbreviated as KCMY, for a given print mode, such as a plain paper fine mode or a photo normal mode. The RGB are primary colors from which other colors can be created as a combination thereof. KCMY are the ink colors of pens implemented in conventional Hewlett-Packard color printers. A typical color map is a multi-dimensional table of output color values of KCMY that are indexed by input color values of RGB, represented by a three-dimensional color space, wherein R is a first axis, G is a second axis and B is a third axis. Color maps are used to translate the primary colors of RGB sent by a computer to a printer into the colors of the printer inks, such as KCMY in a typical Hewlett-Packard color printer.

A wide variety of color maps have been developed for color printers including color inkjet printers for printing various types of color images including viewgraphs and photographs. Conventional schemes have been developed for creating color maps for different print modes and different types of print media supported by a particular model of color printer using a complex process involving ink separation, measurement and gamut mapping. Traditionally, unique color maps are created to achieve acceptable color reproduction for every print mode and print media combination supported by a color printer. Prototyping through final development of each color map may take a cumulative effort of several weeks. Creating color maps using these conventional schemes typically require significant amounts of time, labor and hardware resources.

Furthermore, color maps may be inconsistent in different print modes. In some coarse print modes, such as a typical draft print mode, a significant amount of banding and granulation may occur such that the output cannot be reliably measured for a conventional gamut mapping process. Conventional schemes of creating color maps may cause color variations that may occur when characteristics of different drawing pens are taken into account when computing these color maps.

SUMMARY OF THE INVENTION

In accordance with one embodiment of the present invention, a method of converting a source color map from a source print mode to a destination print mode is provided. The method includes the steps of: (a) performing a constant hue clipping process to preserve ink ratios of destination colors to source colors; and (b) performing a channel independent clipping process to preserve ink volume and saturation.

Another embodiment of the present invention contemplates a method of converting a source color map from a fine source print mode, with a relatively high resolution, to a coarse destination print mode with a relatively low resolution. This method includes: (a) performing a channel independent clipping process to preserve ink volume and saturation; (b) performing a constant hue clipping process to preserve ink ratios of destination colors to source colors; and (c) parametrically adjusting the constant hue clipping process and the channel independent clipping process to generate a parameterized scale factor.

Another method according to the invention described herein may contemplate converting a source color map from a fine source print mode, with a relatively high resolution, to a coarse destination print mode with a relatively low resolution. This method includes: (a) providing a first conversion table mapping indexed color values of black, cyan, magenta and yellow (KCMY) to ink volumes in the source fine print mode; (b) providing a second conversion table mapping ink volumes of KCMY to indexed color values in the destination coarse print mode; (c) converting input color values of KCMY to ink volumes in the source fine print mode; (d) scaling down the ink volumes of KCMY in the source fine print mode; (e) performing a constant hue clipping process to preserve ink ratios of destination colors to source colors; (f) performing a channel independent clipping process to preserve ink volume and saturation; and (g) converting ink volumes of KCMY to indexed color values in the destination coarse print mode.

In a further embodiment of the present invention, a system is provided for converting a source color map from a source print mode to a destination print mode, comprising: a component for performing a constant hue clipping process to preserve ink ratios of destination colors to source colors; and a component for performing a channel independent clipping process to preserve ink volume and saturation.

In a further embodiment of the present invention, a system is provided for converting a source color map from a fine source print mode with a relatively high resolution to a coarse destination print mode with a relatively low resolution, comprising: a component for performing a channel independent clipping process to preserve ink volume and saturation; a component for performing a constant hue clipping process to preserve ink ratios of destination colors to source colors; and a component for parametrically adjusting the constant hue clipping process and the channel independent clipping process to generate a parameterized scale factor.

In a further embodiment of the present invention, a program product is provided for converting a source color map from a source print mode to a destination print mode, comprising machine-readable program code for causing a machine to perform the following method steps: performing a constant hue clipping process to preserve ink ratios of destination colors to source colors; and performing a channel independent clipping process to preserve ink volume and saturation.

In a further embodiment of the present invention, a program product is provided for converting a source color map from a fine source print mode with a relatively high resolution to a coarse destination print mode with a relatively low resolution, comprising machine-readable program code for causing a machine to perform the following method steps: performing a channel independent clipping process to preserve ink volume and saturation; performing a constant hue clipping process to preserve ink ratios of destination colors to source colors; and parametrically adjusting the constant hue clipping process and the channel independent clipping process to generate a parameterized scale factor.

In a further embodiment of the present invention, a program product is provided for converting a source color map from a fine source print mode with a relatively high resolution to a coarse destination print mode with a relatively low resolution, comprising machine-readable program code for causing a machine to perform the following method steps: providing a first conversion table mapping indexed color values of black, cyan, magenta and yellow (KCMY) to ink volumes in the source fine print mode; providing a second conversion table mapping ink volumes of KCMY to indexed color values in the destination coarse print mode; converting input color values of KCMY to ink volumes in the source fine print mode; scaling down the ink volumes of KCMY in the source fine print mode; performing a constant hue clipping process to preserve ink ratios of destination colors to source colors; performing a channel independent clipping process to preserve ink volume and saturation; and converting ink volumes of KCMY to indexed color values in the destination coarse print mode.

BRIEF DESCRIPTION OF THE DRAWINGS

The present invention will be described with respect to particular embodiments thereof, and references will be made to the drawings in which.

DETAILED DESCRIPTION

Embodiments of the present invention provide a method of converting a developed source color map from a known or existing print mode, also called a source print mode, to a new or previously unmapped print mode, also called a destination print mode. In one embodiment, two different clipping processes (to be described below) are combined together in a conversion of a color map from a fine source print mode with a relatively high resolution to a coarse destination print mode with a relatively low resolution. In a further embodiment, a scaling process may be performed on the color map in combination with the two clipping processes. In general, the clipping processes are designed to preserve the mid-tone and light colors but may cause color levels to plateau in saturated regions, thereby leading to a significant loss of detail in some situations. The scaling process, which generally reduces the color values of different colors proportionally, is designed to preserve differentiation of all colors at the expense of saturation and lightness for many mid-tone and light colors.

One example of the clipping processes referred to above is a constant hue clipping process which reduces an overall ink drop volume while preserving the ink ratios of destination colors to source colors. The constant hue clipping process may be performed by applying to the color inputs a conventional constant cue clipping algorithm known to persons skilled in the art. With constant hue clipping, the ink ratios are preserved such that the hue of each resulting destination color in the destination print mode is very close to the corresponding original color in the source print mode.

Another example of the clipping processes referred to above for converting a color map from a source print mode to a destination print mode is called a channel independent clipping process, which generally preserves the overall ink volume and saturation of colors in saturated regions by clipping each color channel independently without regard to color ratios. The channel independent clipping process may cause significant hue shift, however, especially in non-saturated regions. The channel independent clipping process may be performed by using a conventional channel independent clipping algorithm known to persons skilled in the art.

Figure 1:
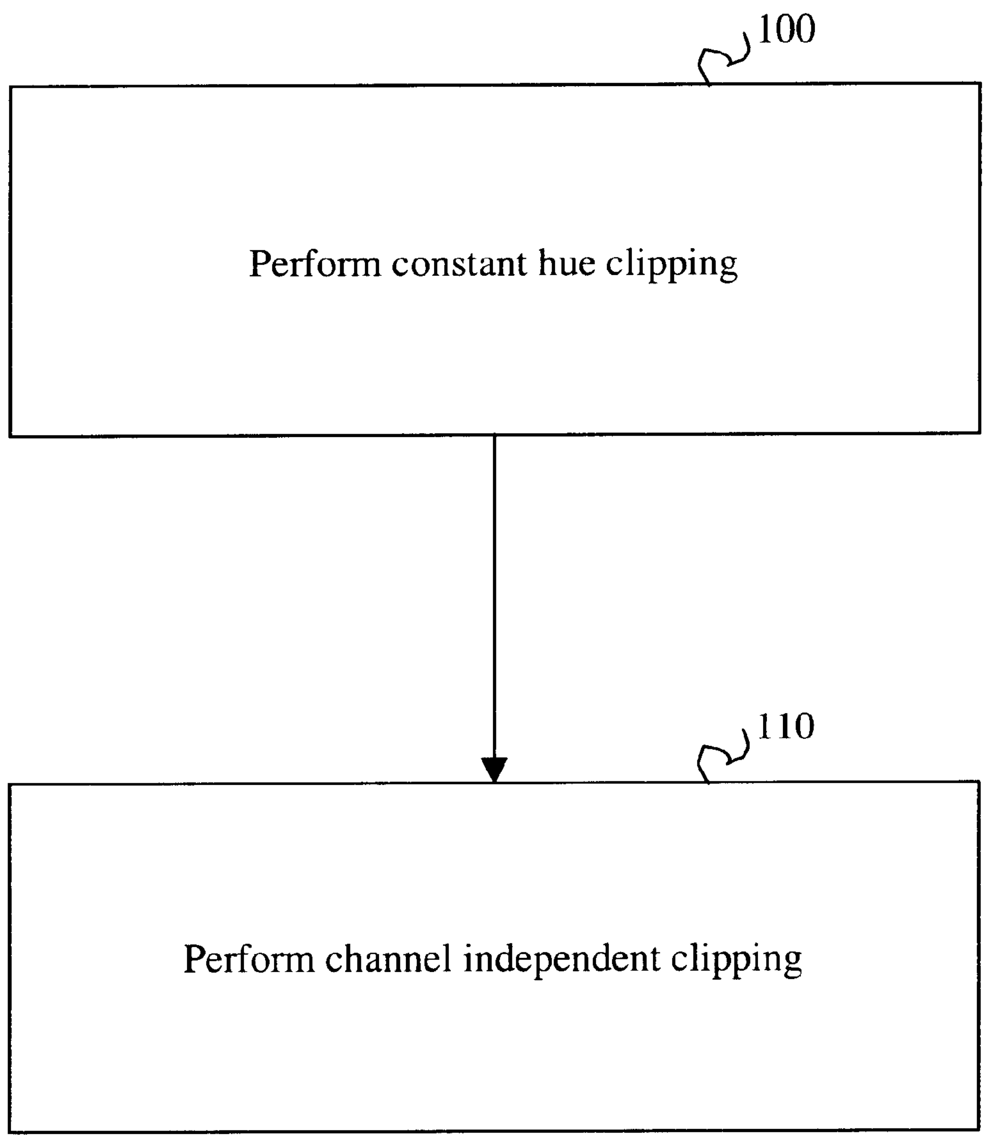
FIG. 1 is a flowchart illustrating a method of converting a color map from a source print mode to a destination print mode according to an embodiment of the present invention.

FIG. 1 is a flowchart illustrating a method of automatic color map conversion from a source print mode to a destination print mode in an embodiment according to the present invention. In this embodiment, a channel independent clipping process in block 100 and a constant hue clipping process in block 110 are both performed on the source color map during the conversion from the source print mode to the destination print mode. These two clipping processes are parametrically adjusted by a person skilled in the art, who may determine the appropriate parameters for constant hue clipping and channel independent clipping by experience with manual tuning of colors.

In an embodiment in which the source print mode is a fine print mode and the destination print mode is a coarse print mode, the ink volume of the source color map in the source print mode can be initially scaled down by a parameterized amount by a person skilled in the art, before the channel independent clipping process is performed. The scale factor for initial scaling of the ink volume of the source color map may be determined empirically by a person skilled in the art. After the ink volume has been scaled down, the color map is channel-independently clipped to a parameterized level, an example of which will be described below. The constant hue clipping process is then performed to further scale the ink volume down to a desired level in the destination print mode.

If the scaling of each color channel is employed independently in the color map conversion, small hue shifts and ink-volume limit variations may be compensated adequately across a set of supported photo print media. Therefore, the method according to an embodiment of the present invention is useful in color map conversions in which the source and destination print modes are of different media types from the same general family, for example, plain paper and photographic media. For example, a typical Hewlett-Packard color inkjet printer product supports three or four different types of photo print media, each of the print media having at least two print modes.

In an embodiment, the source color map in the source print mode is converted to the destination print mode through an intermediary constant ink volume mode. The source color map is first converted from the source print mode to the constant ink volume mode to preserve the ink volume and saturation by performing the channel independent clipping process. Scaling is then performed on the ink volume before the color map is converted from the constant ink volume mode to the destination print mode, which is a new, previously unmapped print mode. An example of color map conversion of printer ink colors (KCMY) will be described in further detail below with reference to FIG. 4.

Figure 2:
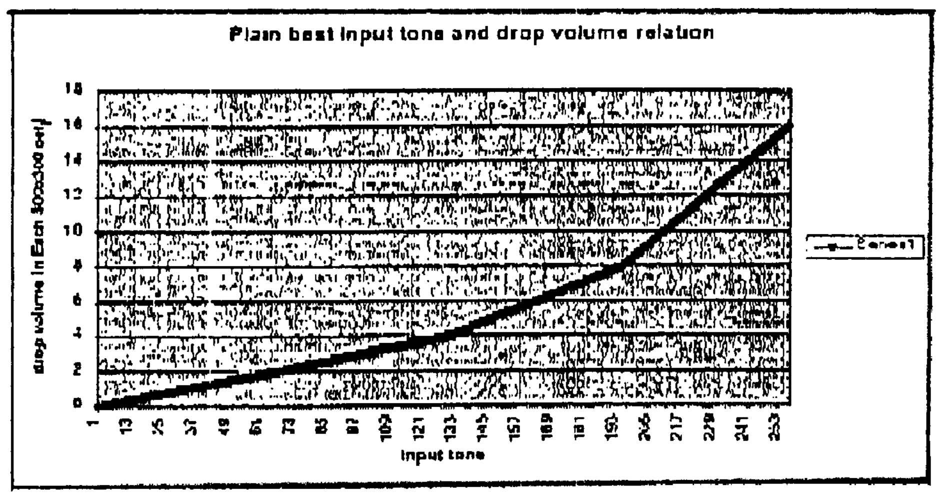
FIG. 2 is a chart illustrating an example of conversion from indexed color values to ink volume in picoliters for a given color channel before scaling and clipping processes are performed on the color map.

FIG. 2 shows a chart illustrating an example of conversion for a given color channel from indexed color values to ink volume in picoliters before scaling and clipping processes are performed on the color map in the source print mode.

The relationship between the drop volume of the ink in each cell of 300×300 pixels and the input tone values of black, cyan, magenta and yellow (KCMY), which are the ink colors used in various color printers including typical Hewlett-Packard inkjet printers, is illustrated by the curve in the chart of FIG. 2.

A first conversion table corresponding to the chart of FIG. 2 for converting indexed color values of KCMY colors in the range of 0–255 to ink volumes in picoliters in the source print mode may be stored as firmware in the read only memory (ROM) of a color inkjet printer, for example. The first conversion table may be derived by pre-calculating empirically how much ink should be put down for each of the KCMY color values by a person skilled in the art. The creation of the first conversion table is not critical to color map conversion according to embodiments of the present invention.

Figure 3:
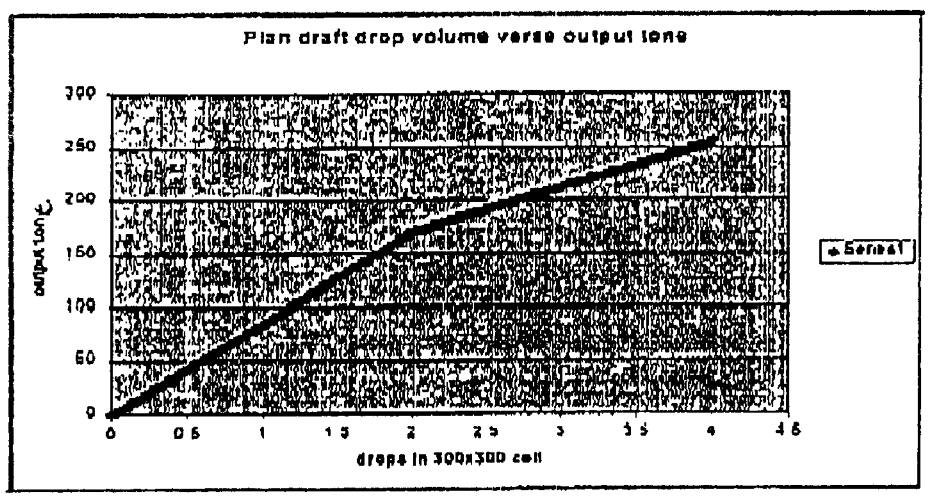
FIG. 3 is a chart illustrating an example of conversion from ink volume in picoliters to indexed color values for a given color channel after scaling and clipping processes are performed on the color map.

FIG. 3 shows a chart illustrating an example of conversion for a given color channel, for example, cyan, magenta, yellow or black, from ink volume in picoliters to indexed color values after scaling and clipping processes are performed on the color map. The relationship between the output tone and the number of drops in each cell of 300×300 pixels is indicated by the curve in FIG. 3.

A second conversion table corresponding to the chart of FIG. 3 for converting the ink volumes in picoliters to indexed KCMY color values in the range of 0–255 in the destination print mode may be stored as firmware in the ROM of the color inkjet printer. The second conversion table may take into account the effect of print mode definition of the destination print mode, a predetermined half-tone break-point table, and a linearization curve for the destination print mode. In an embodiment, the second conversion table based on the chart of FIG. 3 is used in the channel independent clipping process during the conversion from the intermediary constant ink volume mode to the destination print mode. The second conversion table may be derived by determining the relationship between the ink volume and the indexed color value for each of the KCMY colors by a person skilled in the art. The creation of the second conversion table is not critical to color map conversion according to embodiments of the present invention.

In an embodiment in which the source print mode is a fine print mode and the destination print mode is a coarse print mode, such as a normal print mode or a draft print mode, the conversion tables may be applied consecutively to each of the color channels to convert the color map from a nonlinear source space to a nonlinear destination space, if the red, green and blue (RGB) colors are to be mapped to exactly the same ink amount for both source and destination print modes. In many practical applications, however, the maximum ink drop volume of the destination print mode is less than that of the source print mode. In an embodiment in which the source print mode is a fine print mode with a relatively high resolution and the destination print mode is a normal or draft print mode with a relatively low resolution, a color inkjet printer typically makes fewer print passes through a given area of the print media and therefore uses less ink volume in the destination print mode than in the source print mode. Therefore, the constant hue clipping process and the channel independent clipping process are parametrically adjusted, and the overall ink volume is scaled down in such an embodiment. The scale factor for initial scaling and the parameters for the constant hue clipping and channel independent clipping processes may be determined empirically by a person skilled in the art for each of the colors.

Figure 4:
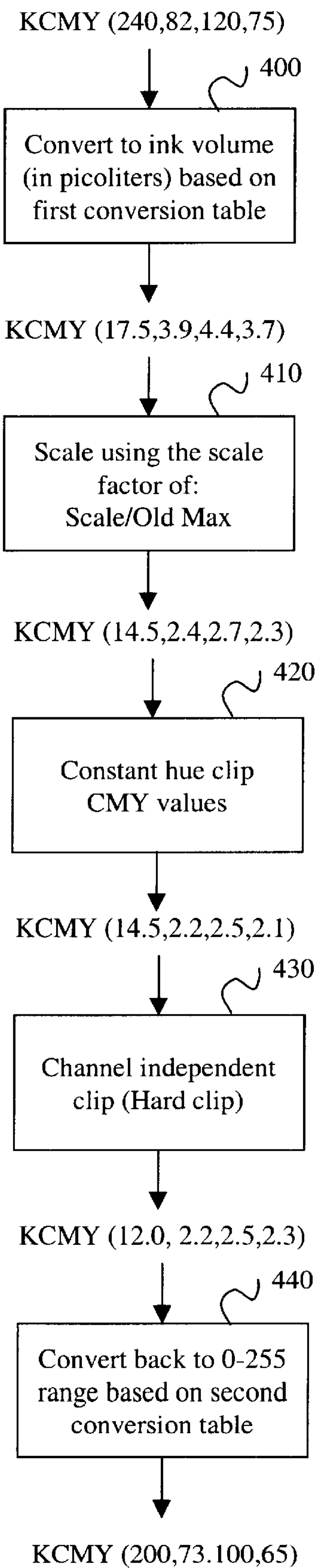
FIG. 4 is a flowchart illustrating an example of converting a KCMY color map from one print mode to another.

FIG. 4 is a flowchart illustrating an example of color map conversion of KCMY color values for a particular color from a source print mode, for example, a plain paper fine mode, to a destination print mode, for example, a photo normal mode. In this example, each of the printer ink colors KCMY has an indexed color value in the range of 0–255, where 0 indicates no presence of such color and 255 represents maximum amount of such color. The source KCMY color values (240, 82, 120, 75) are converted into ink volumes in picoliters (7.5, 3.9, 4.4, 3.7) in block 400, based on a predefined source conversion table, such as the first conversion table equivalent to the chart of FIG. 2, which maps between the indexed color values and the ink volumes for KCMY colors. Conversion tables are usually pre-computed by calculating how much ink should be put down for each KCMY value in a manner known to persons skilled in the art. The creation of conversion tables are not critical to color map conversion according to embodiments of the present invention.

After the KCMY color values are converted into ink volumes for each color in picoliters, the ink volumes are scaled down in block 410 of FIG. 4 by a parameterized scale factor, for example, 15.0/18.0 for black and 5.0/8.0 for each of the CMY colors, determined by taking into account the characteristics of the source and destination print modes. The KCMY ink volumes (17.5, 3.9, 4.4, 3.7) are scaled down to (14.5, 2.4, 2.7, 2.3) in picoliters. A constant hue clipping process in block 420 further scales down the ink volumes to (14.5, 2.2, 2.5, 2.1) in picoliters with a constant hue clip parameter of 2.5 for the CMY colors.

A channel independent clipping process in block 430, also called a hard clipping process, is performed on the KCMY ink volumes to (12.0, 2.2, 2.5, 2.3), using hard clip parameters of 12.0 for black and 3.0 for CMY. In this example, it is apparent that the ink volume of black color (K) is reduced from 14.5 picoliters to 12.0 picoliters, whereas the ink volumes of other colors (CMY) remain nearly the same. After hard clipping, the KCMY ink volumes (3.0, 2.1, 2.3, 2.0) are converted back in block 440 to indexed KCMY color values (200, 73, 100, 65) in the range of 0–255, using a pre-computed destination conversion table, such as the second conversion table equivalent to the chart of FIG. 3, which defines the relationship between ink volumes in picoliters and indexed color values in the range of 0–255. In the example illustrated in FIG. 4, it is possible that the scale factors may not be identical for each of the KCMY colors in the scaling process, and the parameters also may not identical for each of the KCMY colors in constant hue clipping or channel independent clipping.

In a practical application, a source color map can be initially created for the finest print mode of a given print medium, such as plain paper, and color maps of the same print medium in a coarser print mode, such as a normal print mode or a draft print mode, can be derived from the source color map in the finest print mode of the medium using the method of automatic color map conversion according to an embodiment of the present invention, while obviating the need for conventional time-consuming processes of ink separation, measurement and gamut mapping. Furthermore, for applications in which several print media types are similar in physical characteristics but vary slightly in printed output appearance, different color maps for other print media may also be derived from the source color map without the need for sampling the spectral data of the source color map.

Furthermore, the algorithms for the two clipping processes and the scaling process may be stored in firmware in an embodiment, thereby saving a large amount of ROM space that would otherwise be required for storing a large number of color maps each for a unique print mode of a particular print medium. With automatic color map conversion, only a small number of color maps need be stored in the ROM of a color inkjet printer, whereas color maps for various other print modes or other types of print media can be derived in real time prior to each print job. Some of the frequently used destination color maps may be stored in memory while others may be discarded after each print job, for example, thereby affording a great degree of flexibility in various printing applications.

Embodiments of the present invention have been described and numerous modifications can be made which are within the scope of the appended claims.

What is claimed is:

1. A method of converting a source color map from a source print mode to a destination print mode, the method comprising the steps of:

performing a constant hue clipping process to preserve ink ratios of destination colors to source colors; and performing a channel independent clipping process to preserve ink volume and saturation.

2. The method of claim 1, wherein the source print mode comprises a fine print mode.

3. The method of claim 1, wherein the destination print mode comprises a normal print mode.

4. The method of claim 1, wherein the destination print mode comprises a draft print mode.

5. The method of claim 1, further comprising the step of converting input color values of black, cyan, magenta and yellow (KCMY) to ink volumes prior to the step of performing the constant hue clipping process.

6. The method of claim 5, further comprising the step of converting ink volumes of KCMY to indexed color values subsequent to the step of performing the channel independent clipping process.

7. The method of claim 1, further comprising the step of initially scaling down the ink volume of the source color map in the source print mode prior to the step of performing the channel independent clipping process.

8. A method of converting a source color map from a fine source print mode with a relatively high resolution to a coarse destination print mode with a relatively low resolution, the method comprising the steps of:

performing a channel independent clipping process to preserve ink volume and saturation;

performing a constant hue clipping process to preserve ink ratios of destination colors to source colors; and parametrically adjusting the constant hue clipping process and the channel independent clipping process to generate a parameterized scale factor.

9. The method of claim 8, wherein the coarse destination print mode comprises a normal print mode.

10. The method of claim 8, wherein the coarse destination print mode comprises a draft print mode.

11. The method of claim 8, further comprising the step of providing a first conversion table mapping indexed color values of black, cyan, magenta and yellow (KCMY) to ink volumes in the source fine print mode.

12. The method of claim 11, further comprising the step of using the first conversion table to convert input color values of KCMY to ink volumes prior to the step of performing the constant hue clipping process.

13. The method of claim 12, further comprising the step of providing a second conversion table mapping ink volumes of KCMY to indexed color values in the destination coarse print mode.

14. The method of claim 13, further comprising the step of using the second conversion table to convert ink volumes of KCMY to indexed color values subsequent to the step of performing the channel independent clipping process.

15. A method of converting a source color map from a fine source print mode with a relatively high resolution to a coarse destination print mode with a relatively low resolution, the method comprising the steps of:

providing a first conversion table mapping indexed color values of black, cyan, magenta and yellow (KCMY) to ink volumes in the source fine print mode;

providing a second conversion table mapping ink volumes of KCMY to indexed color values in the destination coarse print mode;

converting input color values of KCMY to ink volumes in the source fine print mode;

scaling down the ink volumes of KCMY in the source fine print mode;

performing a constant hue clipping process to preserve ink ratios of destination colors to source colors;

performing a channel independent clipping process to preserve ink volume and saturation; and converting ink volumes of KCMY to indexed color values in the destination coarse print mode.

16. The method of claim 15, wherein the coarse destination print mode comprises a normal print mode.

17. The method of claim 15, wherein the coarse destination print mode comprises a draft print mode.

18. A system for converting a source color map from a source print mode to a destination print mode, comprising:

a component for performing a constant hue clipping process to preserve ink ratios of destination colors to source colors; and a component for performing a channel independent clipping process to preserve ink volume and saturation.

19. The system of claim 18, further comprising a component for converting input color values of black, cyan, magenta and yellow (KCMY) to ink volumes prior to the operation of the component for performing the constant hue clipping process.

20. The system of claim 19, further comprising a component for converting ink volumes of KCMY to indexed color values subsequent to the operation of the component for performing the channel independent clipping process.

21. The system of claim 18, further comprising a component for initially scaling down the ink volume of the source color map in the source print mode prior to the operation of the component for performing the channel independent clipping process.

22. A system for converting a source color map from a fine source print mode with a relatively high resolution to a coarse destination print mode with a relatively low resolution, comprising:

a component for performing a channel independent clipping process to preserve ink volume and saturation;

a component for performing a constant hue clipping process to preserve ink ratios of destination colors to source colors; and a component for parametrically adjusting the constant hue clipping process and the channel independent clipping process to generate a parameterized scale factor.

23. The system of claim 22, further comprising a component for mapping indexed color values of black, cyan, magenta and yellow (KCMY) to ink volumes in the source fine print mode using a first conversion table.

24. The system of claim 23, further comprising a component for converting input color values of KCMY to ink volumes using a first conversion table prior to the operation of the component for performing the constant hue clipping process.

25. A program product for converting a source color map from a source print mode to a destination print mode, comprising machine-readable program code for causing a machine to perform the following method steps:

performing a constant hue clipping process to preserve ink ratios of destination colors to source colors; and performing a channel independent clipping process to preserve ink volume and saturation.

26. The program product of claim 25, wherein the source print mode comprises a fine print mode.

27. The program product of claim 25, wherein the destination print mode comprises a normal print mode.

28. The program product of claim 25, wherein the destination print mode comprises a draft print mode.

29. The program product of claim 25, further comprising code for causing the performance of the step of converting input color values of black, cyan, magenta and yellow (KCMY) to ink volumes prior to the step of performing the constant hue clipping process.

30. The program product of claim 29, further comprising code for causing the performance of the step of converting ink volumes of KCMY to indexed color values subsequent to the step of performing the channel independent clipping process.

31. The program product of claim 25, further comprising code for causing the performance of the step of initially scaling down the ink volume of the source color map in the source print mode prior to the step of performing the channel independent clipping process.

32. A program product for converting a source color map from a fine source print mode with a relatively high resolution to a coarse destination print mode with a relatively low resolution, comprising machine-readable program code for causing a machine to perform the following method steps:

performing a channel independent clipping process to preserve ink volume and saturation;

performing a constant hue clipping process to preserve ink ratios of destination colors to source colors; and parametrically adjusting the constant hue clipping process and the channel independent clipping process to generate a parameterized scale factor.

33. The program product of claim 32, further comprising code for causing the performance of the step of providing a first conversion table mapping indexed color values of black, cyan, magenta and yellow (KCMY) to ink volumes in the source fine print mode.

34. The program product of claim 33, further comprising code for causing the performance of the step of using the first conversion table to convert input color values of KCMY to ink volumes prior to the step of performing the constant hue clipping process.

35. A program product for converting a source color map from a fine source print mode with a relatively high resolution to a coarse destination print mode with a relatively low resolution, comprising machine-readable program code for causing a machine to perform the following method steps:

providing a first conversion table mapping indexed color values of black, cyan, magenta and yellow (KCMY) to ink volumes in the source fine print mode;

providing a second conversion table mapping ink volumes of KCMY to indexed color values in the destination coarse print mode;

converting input color values of KCMY to ink volumes in the source fine print mode;

scaling down the ink volumes of KCMY in the source fine print mode;

performing a constant hue clipping process to preserve ink ratios of destination colors to source colors;

performing a channel independent clipping process to preserve ink volume and saturation; and converting ink volumes of KCMY to indexed color values in the destination coarse print mode.

* * * * *